United States Patent [19]

Wen

[11] Patent Number: 4,549,874

[45] Date of Patent: Oct. 29, 1985

[54] AUTOMATIC SPEED VARIATING MEANS FOR BICYCLE

[76] Inventor: Maz Wen, P.O. Box 10160, Taipei, Taiwan

[21] Appl. No.: 501,656

[22] Filed: Jun. 6, 1983

[51] Int. Cl.[4] .................. B62M 1/08; B62M 1/04; B62M 23/00

[52] U.S. Cl. .................................. 474/69; 474/70; 280/236; 280/251; 280/253

[58] Field of Search ............ 280/253, 255, 251, 236, 280/238; 474/70, 101, 69, 106, 109, 110, 133, 142; 310/92

[56] References Cited

U.S. PATENT DOCUMENTS

| | | | |
|---|---|---|---|
| 636,184 | 10/1899 | Roxendorff | 280/236 |
| 3,759,542 | 9/1973 | Clark | 280/236 |
| 3,913,945 | 10/1975 | Clark | 280/251 |
| 3,954,282 | 5/1976 | Hege | 280/251 |

OTHER PUBLICATIONS

Indiana General, Engineering Data Form 382, published Mar. 1970.

Primary Examiner—Stephen J. Novosad
Assistant Examiner—Bruce M. Kisliuk

[57] ABSTRACT

An automatic speed variating means for bicycle includes a pedal having a driving rod, a speed controller having a magnetic actuator driven by the bicycle wheel and a driving chain driven by the driving rod wherein the depression of the pedal may drive the chain for normal bicycle running and the faster bicycle running may operate the magnetic actuator to exert a greater torque to automatically adjust the speed controller for faster speed variation.

2 Claims, 10 Drawing Figures

AUTOMATIC SPEED VARIATING MEANS FOR BICYCLE

BACKGROUND OF THE INVENTION

Whenever variating the driving speed of a bicycle provided with conventional speed variating means, it takes much time to establish a new speed for the bicycle. It is also difficult to modify the conventional speed variating means to be automatic due to its fixed structure of speed variating mechanism.

The present inventor has found the defects of conventional speed variating means of bicycle and invented the present automatic speed variating means for bicycle.

SUMMARY OF THE INVENTION

The object of the present invention is to provide an automatic speed variating means for bicycle comprising an actuating means, a speed adjusting means and a driving chain wherein the speed adjusting means can be actuated automatically or manually to variate the driving speed of a bicycle.

DETAILED DESCRIPTION

Figure 1:
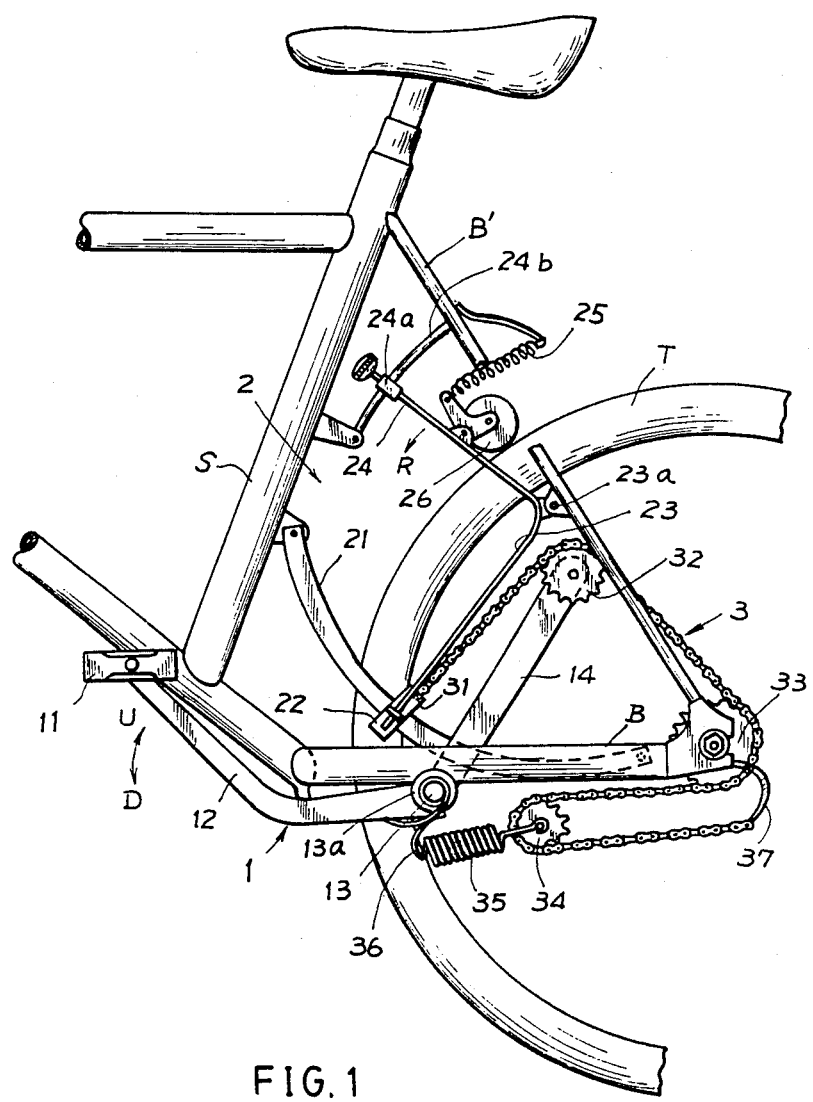
FIG. 1 is a perspective drawing of the present invention.
Figure 2:
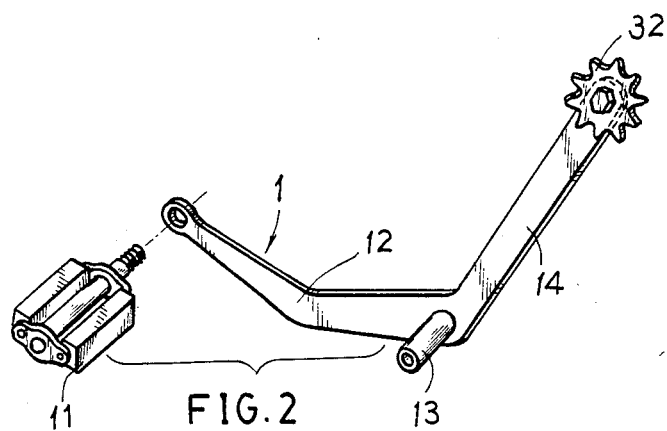
FIG. 2 is an illustration showing the actuating means of the present invention.
Figure 3:
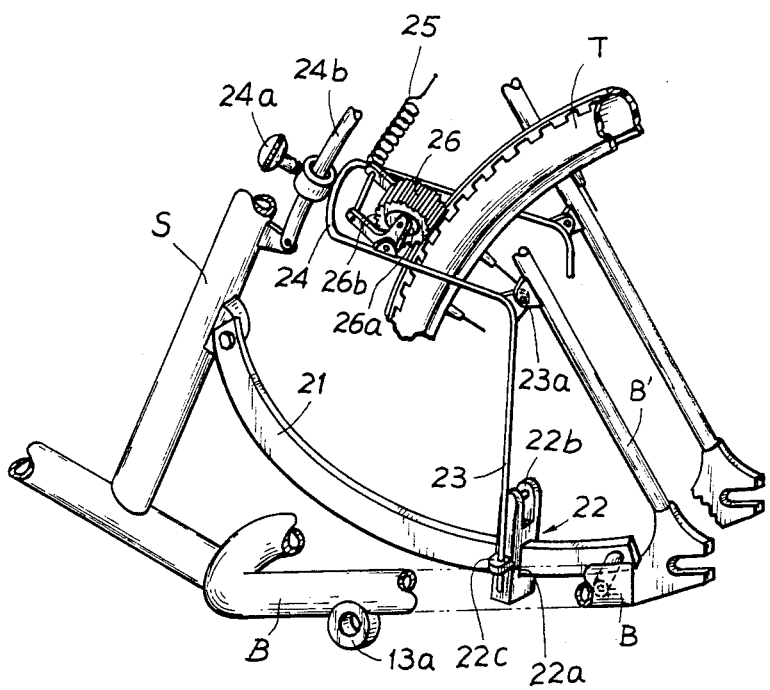
FIG. 3 is an illustration showing the speed adjusting means of the present invention.

As shown in FIGS. 1 through 5, the present invention comprises: an actuating means 1, a speed adjusting means 2 and a driving chain 3.

Actuating means 1 comprises a pedal 11, a pedal rod 12 having a pivot 13 fixed in a bush 13a on bottom fork B and a driving rod 14 which forms an angle with the rod 12. A chain wheel 32 is rotatably formed atop on the driving rod 14.

Speed adjusting means 2 comprises an arcuated plate 21 fixed between the seat tube S and the bottom fork B of a bicycle, a controlling link 23, a sliding block 22 lowerly connected to controlling link 23, a handle 24 upperly formed on link 23, a restored spring 25 fixed to the upper fork B' to restore the speed adjusting means 2 for normal running and magnetic actuator 26 fixed on the upper portion of link 23. Sliding block 22 is formed with a hole 22a for jacketing block 22 into arcuated plate 21. A bracket 22b of block 22 is provided to fix one end 31 of driving chain 3. A side lug 22C of block 22 having a hole is provided for the insertion of link 23. Link 23 is centrally and pivotedly fixed on the upper fork B' of a bicycle by a pivot 23a. The magnetic actuator 26 is pressurized on bicycle wheel T as restored by spring 25. Magnetic actuator 26 comprises a rotor core 26a and a stator collar 26b. Briefly, the magnetic actuator 26 operates by rotating the stator collar about the rotor core. The rotor core would rotate slightly compared to the faster rotating collar due to the magnetic attraction between the magnetic core and the magnetic collar.

Driving chain 3 has its one end 31 fixed on block 22 and has its remaining portion engaged with chain wheel 32 rotatably fixed atop on driving rod 14, a chain wheel 33 formed on the center of bicycle wheel T, a chain wheel 34 which is connected with a restored spring 35 fixed on bottom fork B by a bracket 36, and has its final end 37 fixed on bottom fork B.

Handle 24 is adjustably moved along an arcuated guide 24b and can be stopped by a stopping screw 24a for manual speed adjustment of the invention. For automatic speed variation, the magnetic actuator 26 can be fast rotated if the driving speed is getting higher to exert a greater torque to bias the link 23 in direction R to lower block 22 for faster speed adjustment.

The structure of chain wheel 33 is designed as usual sprocket of a conventional bicycle. When driving the bicycle of the present invention, the pedal 11 is depressed to pull the driving chain 3 so that the chain wheel 33 will be rotated to drive the bicycle. When releasing the depression of pedal, the restored spring 35 will retract the driving chain 3 for next driving operation. The invention changes the conventional way for driving a bicycle by treadling the pedal and rotating the chain sprocket to the present way by depressing the pedal 11 to pull chain 3 to move bicycle forwards and by releasing pedal 11 to reverse the driving chain for next moving operation. Such a modification of pedal movement is especially designed for the speed variation of the present invention.

Figure 4:
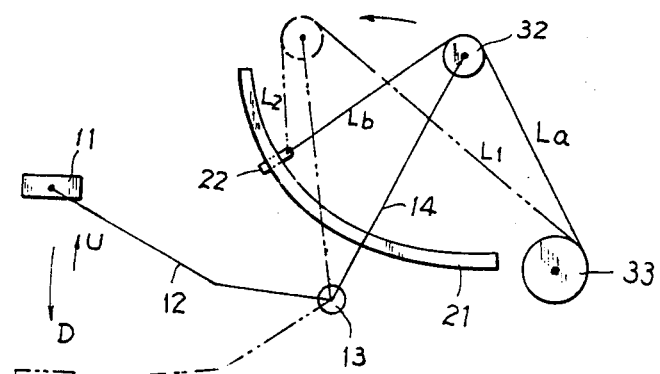
FIG. 4 shows the operation principle of the present invention in a lower speed.
Figure 5:
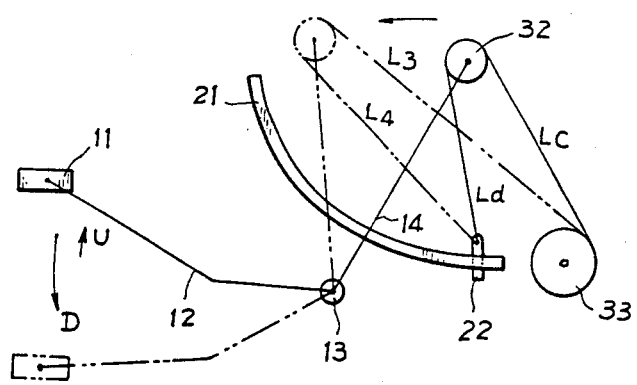
FIG. 5 shows the operation of the present invention at a higher speed.
Figure 6:
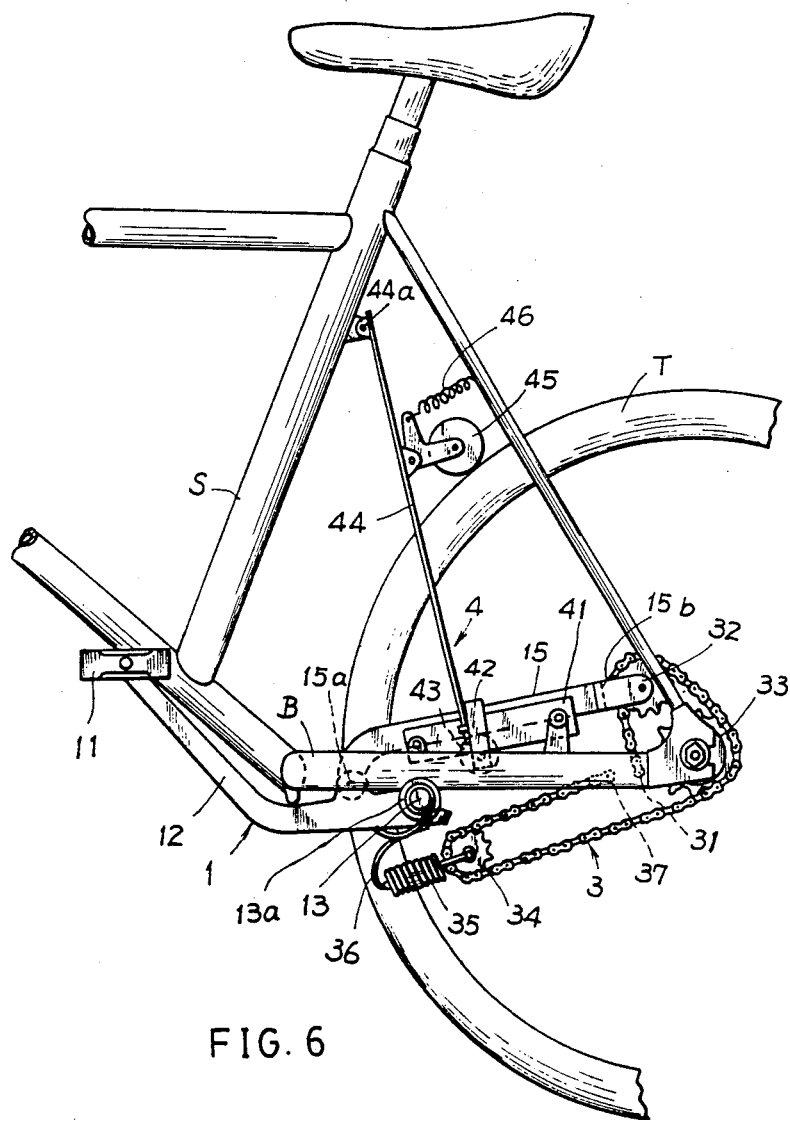
FIG. 6 is a perspective drawing of another preferred embodiment of the present invention.
Figure 7:
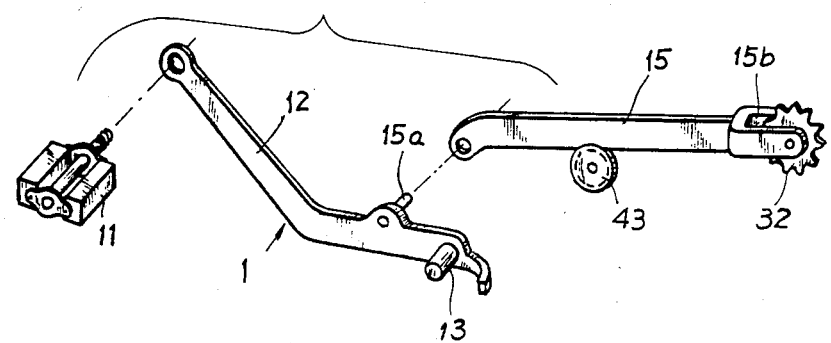
FIG. 7 shows the actuating means of another preferred embodiment of the present invention.
Figure 8:
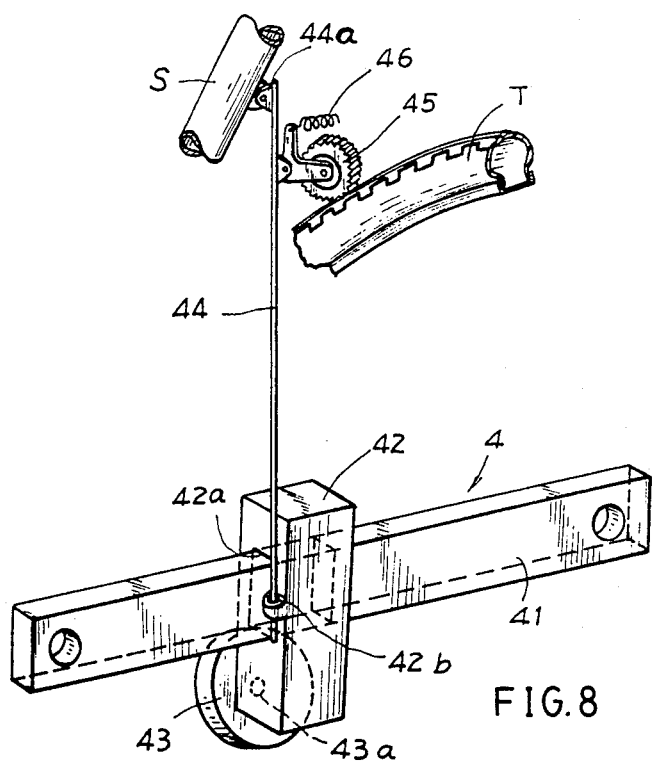
FIG. 8 shows partial speed adjusting means of another embodiment of the present invention.

When changing speed of the present invention by adjusting block 22 downwards from FIG. 4 to FIG. 5, the moving stroke of driving chain 3 in FIG. 4 is $(L1+L2)-(La+Lb)$ and the moving stroke in FIG. 5 is $(L3+L4)-(Lc+Ld)$ by depressing pedal 11 in direction D. Because L1 equals L3 and La+Lb equals Lc+Ld (as hereinafter explained) and L4 is greater than L2, the speed in FIG. 5 is greater than that in FIG. 4 so that the lower the sliding block 22 is positioned on arcuated plate 21, the faster speed of the bicycle will be.

When designing the arcuated plate 21 of the present invention, the length of driving chain 3 among block 22, chain wheel 32 and chain wheel 33 druing moving the block 22 should be always the same. Hence, the length of La+Lb should be equal to the length of Lc+Ld.

Another preferred embodiment of the present invention is shown in FIGS. 6 through 10 which comprises an actuating means 1, a driving chain 3 and a speed controller 4.

Actuating means 1 comprises a pedal 11, a pedal rod 12 terminated by a rear pivot 13 pivotedly fixed in a bush 13a and a driving rod 15 pivotedly formed on pedal rod 12 by a front pivot 15a positioned beyond the rear pivot 13a. Driving rod 15 is formed with a bracket 15b for rotatably fixing a chain wheel 32 on the bracket 15b.

Driving chain 3 has its one end 31 fixed on the bottom fork B and has its remaining portion engaged with a chain wheel 32 rotatably fixed atop on driving rod 15, a chain wheel 33 formed on the center of bicycle wheel T, a chain wheel 34 which is connected with a restored spring 35 fixed on bottom fork by a bracket 36, and has its another end 37 fixed onto bottom fork.

Speed controller 4 comprises a fulcrum adjusting plate 41, a sliding block 42 adjustably sliding on plate 41, a fulcrum wheel 43 rotatably formed on sliding block 42, a link 44 lowerly connected with block 42 and upperly pivotedly connected to seat tube S by a pivot 44a, a restored spring 46 fixed on the upper fork to restore the controller 4 and a magnetic actuator 45 pivotedly fixed on the upper portion of link 44 and pressurized on wheel tire T as restored by spring 46. The driving rod is riding on fulcrum wheel 43.

Figure 9:
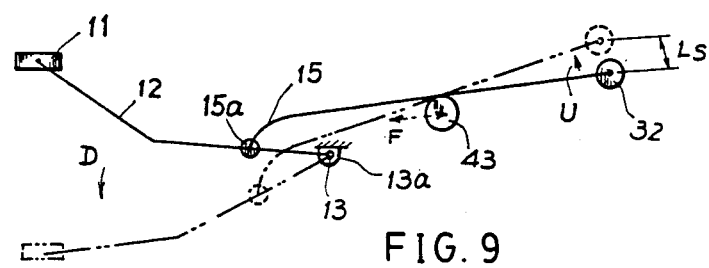
FIG. 9 shows the operation of the present invention as shown in FIG. 6 when driven at a lower speed.
Figure 10:
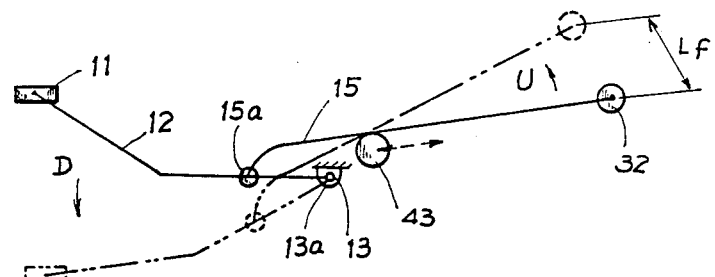
FIG. 10 shows the operation of FIG. 6 at a higher speed.

When adjusting the speed as shown in FIGS. 9 and 10, the depression (direction D) of pedal 11 in FIG. 9 will get a smaller stroke Ls of driving chain (direction U), and, however, the depression in FIG. 10 will obtain a greater stroke Lf by moving the fulcrum wheels 43 forwards (F). Hence, the speed in FIG. 10 will be faster than that of FIG. 9. It means that when the fulcrum wheel 43 is moved forwards to approach the front pivot 15a, the greater chain stroke will be increased to have a faster speed.

I claim:

1. An automatic speed variating means for a bicycle comprising: an actuating means including a pedal, a pedal rod having a pivot pivotedly fixed in a bush fixed on a bottom fork of the bicycle and a driving rod extending from said pivot to form an angle with said pedal rod;

a speed adjusting means including an arcuate plate fixed between a seat tube and the bottom fork of a bicycle, a sliding block adjustably slidable along said arcuate plate, a controlling link centrally pivotedly fixed on an upper fork of a bicycle and lowerly connected with said sliding block and upperly formed with a handle, a first restoring spring means fixed to the upper fork of a bicycle to restore said speed adjusting means for normal bicycle running and a magnetic actuator fixed on said controlling link; and a driving chain having its one end fixed on said sliding block and having the chain portion engaged with a first chain wheel rotatably fixed atop said driving rod, a second chain wheel formed on the center of a bicycle wheel, a third chain wheel which is connected at one end with a second restoring spring means fixed on said pivot by a bracket, and said chain having its other end fixed on the bottom fork adjacent said center of the bicycle wheel, the improvement comprising:

said magnetic actuator having a rotor core and a stator collar, pivotedly fixed on the upper portion of said controlling link and pressed on the bicycle wheel by said first restoring spring means whereby said magnetic actuator operates by rotating said stator collar about said rotor core to urge said rotor core to rotate in the same direction as the faster rotating stator collar to thereby exert a torque biasing said controlling link to lower said sliding block along said arcuate plate and thereby increase the stroke of said driving chain for automatic speed variation.

2. An automatic speed variating means for a bicycle comprising:

an actuating means including a pedal, a pedal rod having a rear pivot pivotedly fixed on a bottom fork of said bicycle and a driving rod pivotedly formed on said pedal rod by a front pivot positioned beyond said rear pivot;

a driving chain having its one end fixed on the bottom fork and having the remaining chain portion engaged with a first chain wheel rotatably fixed atop said driving rod, a second chain wheel formed on the center of a bicycle wheel, a third chain wheel which is connected with a first restoring spring means fixed onto the front pivot by a bracket and said driving chain having its other end fixed onto the bottom fork adjacent said center of bicycle wheel; and a speed controller having a fulcrum adjusting plate fixed on the bottom fork, a sliding block slidingly adjustable on said fulcrum adjusting plate, a fulcrum wheel rotatably mounted on said sliding block, a link connected at a lower end to said sliding block and pivotedly connected at an upper end to a seat tube, a magnetic actuator fixed on an upper portion of said link and a second restoring spring means fixed on an upper fork to restore said speed controller for normal bicycle running, said driving rod of said actuating means being pivoted on said fulcrum wheel and said fulcrum wheel being movable by sliding said sliding block along said adjusting plate, the improvement comprising:

said magnetic actuator having a rotor core and a stator collar, said magnetic actuator pivotedly fixed on the upper portion of said link and pressed on the bicycle wheel by said second restoring spring means, whereby said magnetic actuator operates by rotating said stator collar about said rotor core to urge said rotor core to rotate in the same direction as the faster rotating stator collar to thereby exert a torque to bias said link to move said fulcrum wheel forward to increase the chain stroke for faster speed variation.

* * * * *